United States Patent [19]
Dery et al.

[11] Patent Number: 5,673,017
[45] Date of Patent: Sep. 30, 1997

[54] REMOTE VEHICLE STARTING SYSTEM

[75] Inventors: Normand Dery, Sherbrooke; Guy Mailhot, St-Elied'Orford; Alain Jean, Sherbrooke, all of Canada

[73] Assignee: Astroflex Inc., St-Elie D'Orford

[21] Appl. No.: 410,408

[22] Filed: Mar. 27, 1995

Related U.S. Application Data

[63] Continuation of Ser. No. 116,460, Sep. 3, 1993, abandoned.

[51] Int. Cl.$^6$ ............................ B60R 25/10; G08C 19/12
[52] U.S. Cl. ............. 340/426; 340/425.5; 340/825.69; 340/825.72; 341/176; 123/179.2; 361/171
[58] Field of Search ................. 340/426, 425.5, 340/539, 825.69, 825.72, 825.5, 825.22, 825.3, 825.7, 825.31; 341/173, 176; 361/171, 172; 123/179.2

[56] References Cited

U.S. PATENT DOCUMENTS

| | | | |
|---|---|---|---|
| 4,413,261 | 11/1983 | Greenberg | 340/825.69 |
| 4,535,333 | 8/1985 | Twardowski | 340/825.69 |
| 4,734,255 | 3/1988 | Sanders et al. | 420/492 |
| 4,754,255 | 6/1988 | Sanders et al. | 340/539 |
| 4,893,240 | 1/1990 | Karkouti | 364/424.05 |
| 4,922,224 | 5/1990 | Drori et al. | 340/428 |
| 4,942,393 | 7/1990 | Waraksa et al. | 340/825.72 |
| 4,988,992 | 1/1991 | Heitschel et al. | 340/825.69 |
| 5,049,867 | 9/1991 | Stouffer | 340/506 |
| 5,054,569 | 10/1991 | Scott et al. | 340/502 |
| 5,111,199 | 5/1992 | Tomoda et al. | 340/825.72 |
| 5,113,182 | 5/1992 | Suman et al. | 340/426 |
| 5,146,215 | 9/1992 | Drori | 340/825.32 |
| 5,157,375 | 10/1992 | Drori | 340/429 |

FOREIGN PATENT DOCUMENTS

| | | |
|---|---|---|
| 1106449 | 8/1981 | Canada. |
| 2036740 | 9/1991 | Canada. |

*Primary Examiner*—Donnie L. Crosland
*Attorney, Agent, or Firm*—Curtis, Morris & Safford, P.C.

[57] ABSTRACT

A system for remotely starting a motor of a vehicle and also capable of operating various vehicle accessories such as alarm system, door locks, door windows, trunk latch, etc. The system comprises a portable hand-held transmitter generating a command in the form of a binary coded sequence and a controller mounted in the vehicle for operating the vehicle's motor and accessories in dependence thereon. The system is characterized by a novel encoding scheme of the digitized sequence that prevents command misinterpretation by the controller, thereby avoiding an unintended avocation of the vehicle's motor or another accessory.

17 Claims, 3 Drawing Sheets

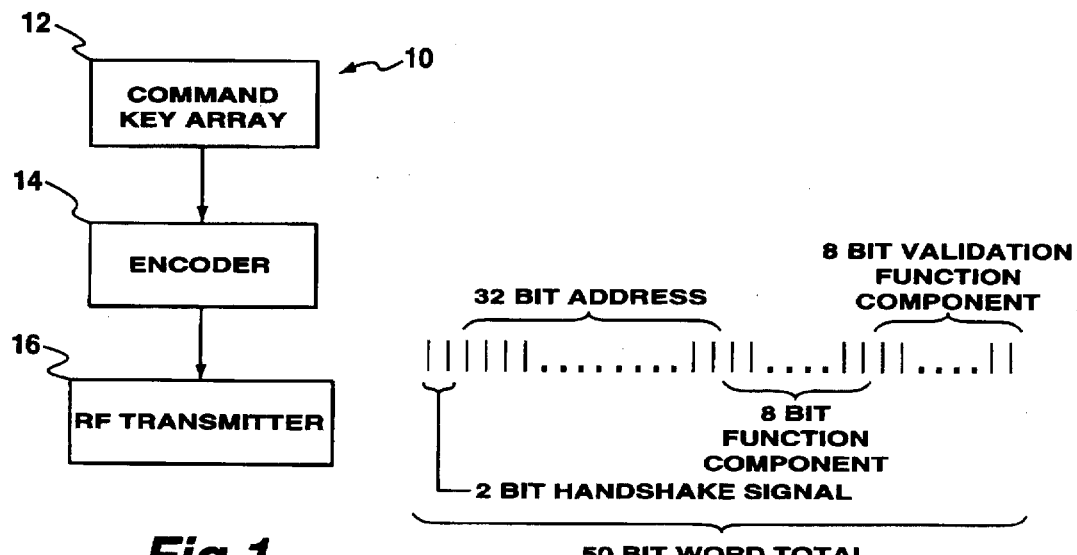
*Fig.1*
*Fig.3*
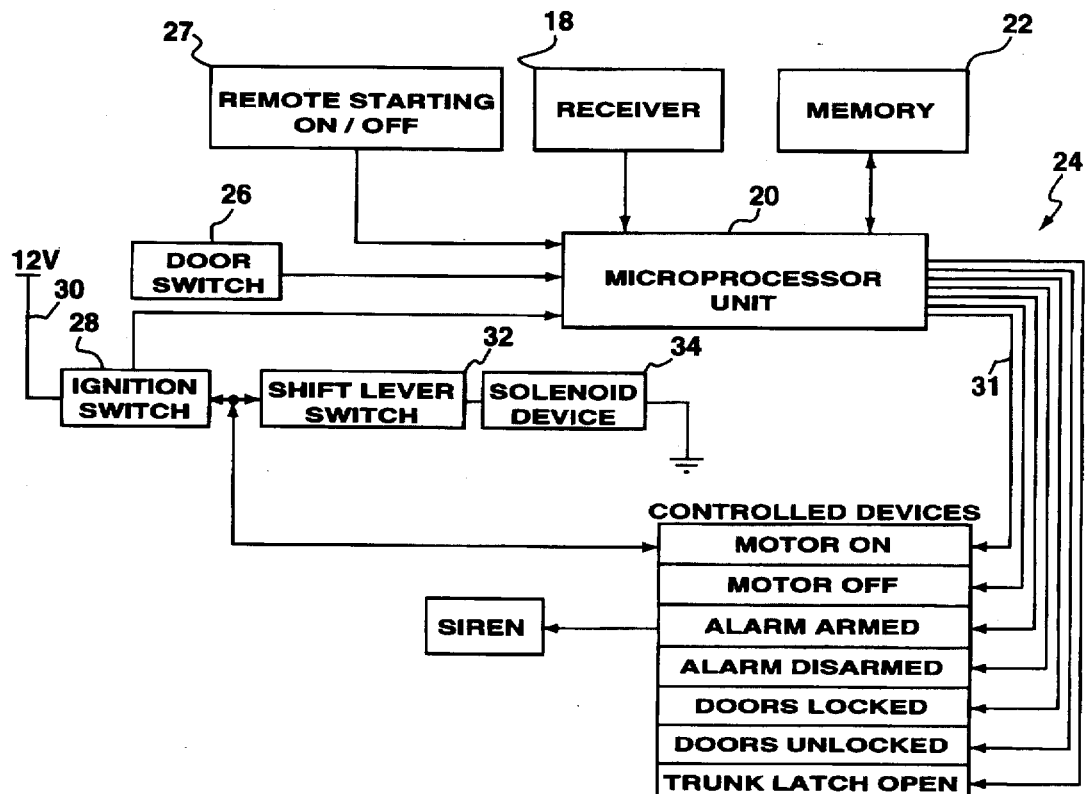
*Fig.2*

REMOTE VEHICLE STARTING SYSTEM

This application is a continuation of application Ser. No. 08/116,460, filed Sep. 3, 1993 now abandoned.

FIELD OF THE INVENTION

The invention relates to an apparatus for remotely operating selected components of a vehicle, such as the motor, alarm system, door locks, door windows, trunk latch, etc.

BACKGROUND OF THE INVENTION

Currently marketed remote vehicle starting systems utilize binary codes generated from a portable hand-held transmitter in order to remotely start the vehicle or to perform some other function, such as activating the alarm system of the vehicle, locking the doors, closing or opening power operated windows, among others.

Normally, the binary command code comprises a first portion which is essentially an address identifying the particular vehicle whose motor or accessory is to be operated. A second portion of the binary command signal is used to convey a code representing the function to be executed by the vehicle.

When the portable hand-held transmitter is far from the receiver mounted in the vehicle, or under severe electromagnetic noise conditions, the binary signal sensed by the receiver may be corrupted. If an error occurs in the address portion of the signal, the only drawback is that the vehicle will not recognize the address which will require that the owner operating the transmitter makes another try. However, if a logical zero is interpreted as a logical one or vice-versa, in the command portion of the signal, the resulting modified code may in some circumstances correspond to a valid command, whereby the vehicle may perform an operation other than what was intended by the owner. For example, if the owner would like to activate the alarm system, the motor of the vehicle may inadvertently be started.

OBJECTS AND STATEMENT OF THE INVENTION

An object of the invention is a novel system for remotely operating selected components of a vehicle, having the ability to validate the function component of the binary signal generated by the portable hand-held transmitter to avoid an unintended operation of the vehicle's motor or other accessory.

Another object of the invention is a novel remote control vehicle security system allowing the vehicle to be operated without fully disabling the security system in a situation when the portable hand-held transmitter that is normally used to arm or disarm the security system is inoperative or lost.

Another object of the invention is a novel system for remotely operating selected components of a vehicle, capable of being reprogrammed to recognize the signal from a new portable hand-held transmitter.

Yet, another object of the invention is an electronic remote starting system capable of sensing the position of the shift lever of the vehicle transmission in order to prevent cranking of the motor when the transmission is in a position other than neutral or park.

As embodied and broadly described herein, the invention provides a system for remotely operating selected components of a vehicle, said system comprising:

a portable hand held transmitter, including:

- a) means for generating a binary coded sequence including an address component uniquely identifying a vehicle to which said binary coded sequence is directed, a function component indicative of a desired operational state of a selected component of the vehicle and a validation function component, said validation function component being constituted by said function component in a coded state;
- b) means for transmitting said binary coded sequence as a radio frequency signal;

a controller for mounting in the vehicle, said controller including:

- c) means for receiving said radio frequency signal and for deriving from said radio frequency signal said address component, said function component and said validation function component;
- d) means for storing a vehicle identification code uniquely identifying the vehicle in which said controller is to be mounted;
- e) means for comparing said vehicle identification component with said address component;
- f) means for decoding said validation function component for generating a decoded validation function component;
- g) means for comparing said function component and said decoded validation function component; and
- h) means for generating a signal for interfacing with the vehicle to bring the selected component of the vehicle into the desired operational state when:
  - i) said address component matches said vehicle identification code; and
  - ii) said decoded validation function component matches said function component.

The communication protocol that consists of generating a validation function component which is a coded version of the function component itself is an advantageous way of avoiding or at least significantly limiting command misinterpretation by the controller. If somehow the function component is corrupted during the transmission, the decoded validation function component will no longer match the function component received by the controller. This condition is recognized and the controller will reject the function component, thereby avoiding unintended operation of the vehicle's motor or other component.

In a most preferred embodiment, the coding scheme of the function component, in order to generate the validation function component, consists of reversing the logical state of each bit of the function component, whereby a logical one becomes a logical zero and vice-versa. The decoding scheme at the controller site is the reverse operation in order to regenerate the bit sequence representing the function component.

As embodied and broadly described herein, the invention provides an electronic remote control vehicle security system, comprising;

a portable hand-held transmitter for generating a predetermined RF command signal;

vehicle antitheft means for mounting in a vehicle, said vehicle antitheft means being capable of assuming ether one of an active operational state and a passive operational state, said vehicle antitheft means including;

- a) means for receiving said predetermined RF command signal;
- b) detecting means for sensing attempted intrusions in the vehicle,
- e) means for generating an alarm signal responsive to indication of a detected intrusion by said detecting means when said vehicle antitheft means is in an armed mode, said vehicle antitheft means being capable to assume a disarmed mode in which said vehicle antitheft means is disabled, in said active operational state said vehicle antitheft means being responsive to said predetermined RF command signal for switching from one of said armed and disarmed modes to another of said armed and disarmed modes, in said passive operational state said vehicle antitheft means being responsive to an operation of at least one component of the vehicle for switching from one of said armed and disarmed modes to another of said armed and disarmed modes after a predetermined time interval has elapsed from said first operation, said vehicle antitheft means when being in said active operational state being responsive to an operation of at least one component of the vehicle for switching from said active operational state to said passive operational state.

In a preferred embodiment, an electronic remote vehicle starting system and a remote control vehicle security system are integrated into a single unit allowing the user to selectively start the motor of the vehicle, or arm or disarm an alarm system by entering the appropriate commands on a portable hand-held transmitter. The alarm system can assume either an active operational state or a passive operational state. In the active operational state, only the portable hand-held transmitter can arm or disarm the alarm while in the passive operational state, automatic arming and disarming is effected after predetermined exit or entry delay. More specifically, the alarm automatically arms itself when a predetermined time period has elapsed after the door of the vehicle is closed and the ignition is in the off position. Passive disarming occurs when the ignition key has been turned to the on position before expiration of a 30 second entry delay.

The characterizing feature of the invention resides in the ability of the alarm system to switch from the active to the passive operational state in response to an operation of a component of a vehicle or a sequence of operation of several components of the vehicle such as opening the door, turning the ignition key, etc. This feature is advantageous in situations where the alarm has been set in the active mode and the hand-held transmitter is either lost by the user or is not functioning properly. By allowing to switch the alarm to the passive operational state, without the necessity of using a hand-held transmitter, the system permits the vehicle to be operated with an alarm system set in such operative state that it can be armed or disarmed without the remote transmitter.

As embodied and broadly described herein, the invention also provides a remotely programmable electronic system for remotely operating selected components of a vehicle, said system comprising;

a portable hand-held transmitter for generating a predetermined, digitally encoded RF signal;

a controller for mounting in the vehicle, said controller being capable of receiving said predetermined digitally encoded RF signal and being capable of assuming either one of a program mode and a function mode, in said function mode said controller being capable of executing a command conveyed by said predetermined RF signal in order to bring a selected component of the vehicle in a desired operational state, in said program mode said controller being capable of recording information generated by said portable hand-held transmitter and conveyed by said predetermined RF signal, said controller being responsive to an operation of at least one component of the vehicle for switching from said function mode to said program mode.

The ability of the controller mounted on board the vehicle to assume the program mode without the necessity of using the hand-held transmitter is used in order to reprogram the controller for recognizing and validating a new digitally encoded RF signal. This is useful when the hand-held transmitter of the user is either lost or not functioning properly and the system must be set to recognize a new hand-held transmitter generating a different address code than the original unit.

As embodied and broadly described herein, the invention provides an electronic remote starting system for use with a vehicle comprising:

a) an internal combustion motor;

b) an electric starter motor to start-up the internal combustion motor;

c) a solenoid device for establishing a driving relationship between the electric starter motor and the internal combustion motor, thereby allowing the electric starter motor to crank the internal combustion motor;

d) a conductor establishing an electrical path for supplying electrical energy to the solenoid device;

e) a key operated ignition switch in said electrical path;

f) a safety switch in said electrical path between the ignition switch and the solenoid device, the safety switch being responsive to a position of a shift lever of a transmission of the vehicle, when the shift lever is in a position such that the transmission establishes a driving relationship between the motor of the vehicle and a wheel thereof, the safety switch being in an opened condition to prevent actuation of the solenoid device, said remote electronic remote starting system comprising;

i) a portable hand-held transmitter for generating a predetermined RF signal conveying a command to start a motor of the vehicle;

ii) a controller for mounting on the vehicle, said controller including:

a receiver for sensing said predetermined RF signal;

an electrical conductor for connection to said electrical path between said ignition switch and said safety switch, said controller constituting means for supplying electrical power to said solenoid device for cranking the internal combustion motor in response to reception of said predetermined RF signal by said receiver;

said controller including means for sensing an electrical condition of the safety switch through an electrical pathway established by said electrical conductor to preclude actuation of the solenoid device when the safety switch is in the opened condition.

BRIEF DESCRIPTION OF THE DRAWINGS

FIG. 1 is a block diagram of the portable hand-held transmitter of the remote vehicle starting system in accordance with the invention;

FIG. 2 is a block diagram of the controller system mounted on board the vehicle;

FIG. 3 is a diagrammatic illustration showing the preferred method of signal transmission between the portable hand-held transmitter and the controller;

DESCRIPTION OF A PREFERRED EMBODIMENT

Figure 4:
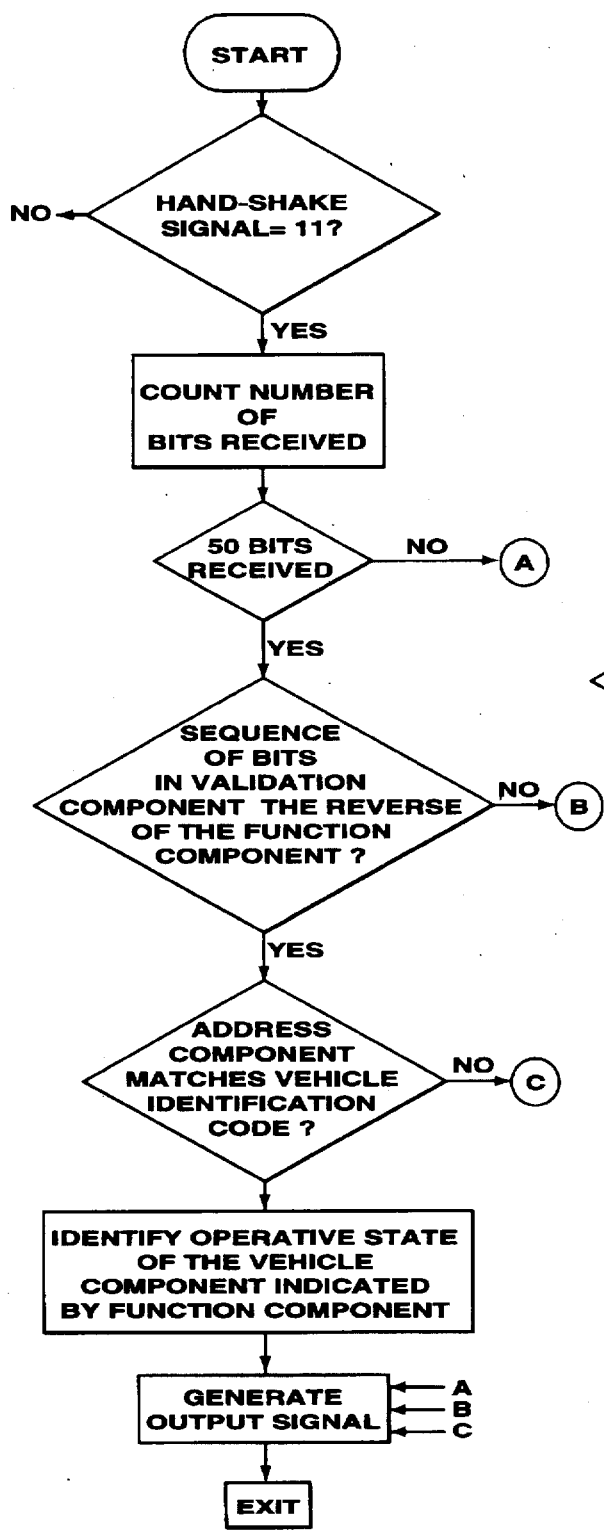
FIG. 4 is a simplified schematic illustration of a flow chart illustrating the validation process performed by the controller to authenticate the binary coded sequence generated by the portable hand-held transmitter.

In the preferred embodiment, the remote vehicle starting system in accordance with the invention comprises a portable hand held transmitter and a controller mounted on board the vehicle. Each unit is schematically depicted in FIGS. 1 and 2 respectively. With reference to FIG. 1, the portable hand-held transmitter designated comprehensively by the reference numeral 10 includes an array of keys 12 that can be depressed individually or in sequence to command various functions of the vehicle such as starting the motor, activating or deactivating the alarm system, looking or unlocking the doors, raising or lowering the windows, unlocking the trunk, among others. The signals generated by depressing one or more of the keys of the array 12 are supplied to an encoder 14 generating a composite binary coded sequence that is supplied to an RF transmitter 16 for transmission of the coded sequence to operate a selected component of the vehicle. A transmitter circuit MC 145026 manufactured by Motorola has been found satisfactory. The encoder may be constituted by a non-volatile memory such as EEPROM that contains a map of the binary coded sequences indicative of the various operational states of the vehicle components that are remotely controlled, correlated with various signals generated by the command key array 12. When a certain key, or a combination of keys are depressed, the ensuing signal is supplied to the memory which retrieves from the map the corresponding binary coded sequence. In turn, the sequence is supplied to the RF transmitter for transmission to the control unit in the vehicle.

In a different form of construction, the encoder may be constituted by an array of hardwired logic gates generating the predetermined binary coded sequence in response to the signals of the command key array 12. This mode of construction is cheaper than the approach using a non-volatile memory at the expense of a reduced flexibility. For instance, a hardwired logical circuit must be entirely redesigned when a change in the binary coded sequence is required. In contrast with an EEPROM it suffices to reprogram the memory to complete this task.

The preferred pattern for the binary coded sequence generated by the encoder 14 is depicted in FIG. 3. The binary coded sequence is a 50 bit word comprising a two bit hand-shake signal having the logical value 1 1. The hand-shake signal is followed by a 32 bit address component whose purpose is to identify uniquely the vehicle to which the binary coded sequence is directed. The address component is followed by an 8 bit function component indicative of the desired function that the vehicle should perform, such as starting the motor, activating the alarm system, etc. The last segment of the binary coded sequence is an 8 bit validation function component that is a coded version of the function component. The purpose of the validation function component is to allow the controller unit in the vehicle to validate the binary coded sequence as it will be described hereinafter.

Various coding schemes may be adopted for generating the 8 bit validation function component. In a preferred embodiment, a coding method that consists of reversing the logical value of each bit of the function component is used. For example, if the function component has the following bit sequence 1 1 0 1 0 0 1 0 the validation function component will be 0 0 1 0 1 1 0 1

With reference to FIG. 2, the control unit which is mounted on board the vehicle comprises a receiver 18 that receives the incoming RF signals from the transmitter 16 and converts the signals into a binary form suitable for processing by a microprocessor unit 20. A receiver circuit MC 145027 manufactured by Motorola has been found satisfactory. The microprocessor unit is software driven and executes instructions that are stored into a non-volatile memory 22 such as an EEPROM. The microprocessor unit generates control signals on a bus 24 that leads to the various components of the vehicle that are controlled. The bus 24 interfaces with the vehicle wiring to carry out the desired functions. It should be appreciated that the interface between the bus 24 and the wiring of the vehicle is effected through power semi-conductors or relays (not shown in the drawings) having the voltage and current carrying capacity required to actuate the various accessories of the vehicle.

The microprocessor unit 20 interfaces with the door switch 26 of the vehicle in order to determine if the door is opened or closed. The microprocessor unit is also connected to the ignition switch for determining whether the ignition is at the ON or at the OFF position. The microprocessor unit also includes a manually activated switch 27, mounted inside the vehicle for enabling or disabling the remote starting function of the system. In addition, the microprocessor unit also senses the impedance in the circuit that supplies electrical power to the solenoid actuating the starter motor of the vehicle for the purpose of monitoring whether the transmission of the vehicle is in the park or the neutral position so as to enable the motor of the vehicle to be cranked. A typical circuit of a starter motor solenoid comprises an electrical conductor 30 that is usually connected to the positive terminal of the battery. The ignition switch 28 and a shift lever switch 32 that are mounted in series within the electrical path of the conductor 30 control the actuation of the starter motor solenoid 34. When the ignition switch 28 and the shift lever switch 32 are closed the solenoid device is actuated allowing the starter motor to crank the engine of the vehicle.

The shift lever switch is installed by the manufacturer of the vehicle as a safety measure to prevent cranking of the engine when the transmission is in any other position than neutral or park. Typically, the switch 32 is controlled by the position of the shift lever and is closed when the lever is at park or neutral.

Since a remote control system is designed to start the engine of the vehicle fully automatically without requiring the presence of a human within the vehicle, the ignition switch 28 in the conductor 30 provided by the manufacturer of the vehicle must be bypassed so as to allow the starter motor solenoid 34 to operate. The power bypass circuit 31 runs from the microprocessor unit 20 and connects to the conductor 30 between the ignition switch 28 and the shift lever switch 32. When the microprocessor unit 20 issues a signal to crank the motor of the vehicle, electrical power is impressed on the conductor 30 by the circuit 31 to actuate the solenoid device while the ignition switch 28 is in the OFF position.

The controller in accordance with the invention also monitors the state of the shift lever switch 32, through the electrical path established by conductor 37, in order to prevent cranking of the engine of the vehicle when the transmission is in any other position than park or neutral. This is achieved by sensing the impedance in the conductor 30 at a point between the ignition switch and the shift lever switch to ground. The measurement is made through the circuit 31 that also serves the purpose of powering the solenoid device 34. If the impedance is low, the microprocessor unit 20 determines that the shift lever switch 32 is closed. At that point electric power is supplied to the circuit 31 to energize the solenoid device 34. On the other hand, if the impedance is high, the microprocessor unit 20 determines that the shift lever switch 32 is in the opened condition which means that the engine cannot be cranked. Consequently, no power is supplied to the circuit 31 and the start-up procedure is aborted.

Figure 7:
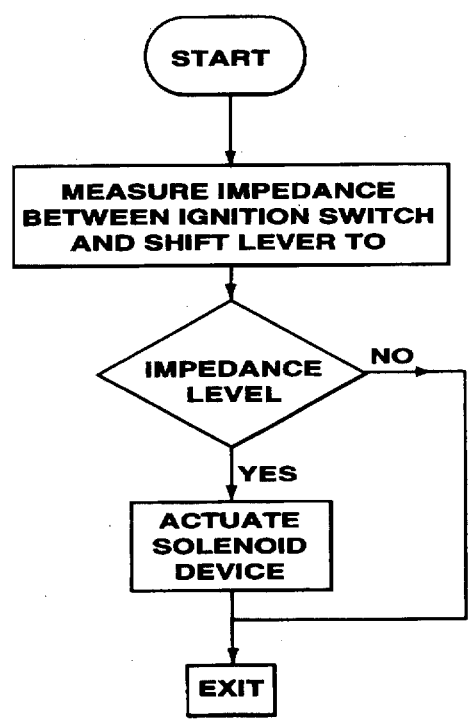
FIG. 7 is a simplified schematic illustration of a flow chart illustrating the safety procedure that consists of monitoring the state of the transmission safety switch before cranking the motor of the vehicle.

When the portable hand-held transmitter 10 generates a signal indicating to the controller to start the vehicle, the signal is first validated as it will be described subsequently and then the engine of the vehicle is cranked. However, before the cranking signal is effected, the microprocessor 20 effects a safety verification to determine if the transmission of the vehicle is in park or in neutral. The flow chart of the operation is illustrated in FIG. 7. The microprocessor unit measures the impedance in the conductor 20 between the ignition switch 28 and the shift lever switch 32 to ground. A low impedance level means that the shift lever switch is closed, thereby the transmission is in park or neutral. At that point, power is supplied to the solenoid device through the bypass line in order to crank the engine. However, if a high impedance level is detected, indicating that the shift lever switch is open, the program is aborted and no cranking of the engine occurs.

A flow chart of the software stored in the memory 22 for validating the signal generated by the hand-held transmitter is illustrated in FIG. 4. The first step in the execution of the program is a verification of the incoming signal to determine if the signal has the proper hand-shake signal, that is the 2 bit word 1 1. In the affirmative, the system counts the number of bits that are received. If 50 bits are counted, then the system compares the 8 bit function component and the 8 bit validation function component to determine if the latter is the reverse of the former. More specifically, this is achieved by decoding the 8 bit validation function component by reversing the logical state of each bit of the sequence of bits that form the validation function component. The decoded validation function component is then compared with the function component. If a match is observed, the function component is validated.

Subsequently, the address component is compared with a vehicle identification code that is stored in the memory 22 and which uniquely identifies the vehicle, so that the controller accepts commands from the transmitter of the legitimate owner. If the address component and the vehicle identification code match, the system next identifies what is the function which must be performed by the vehicle. At this end, the memory 23 is provided with a list of all the function components that could possibly be generated by the hand-held transmitter and corresponding to valid commands. When a match is found between a particular one of the function components in the list and the function component contained in the digital signal received from the hand-held transmitter, the microprocessor unit generates a unique command signal that either closes or opens a circuit in the vehicle wiring in order to bring the selected component of the vehicle to the desired operative state. FIG. 2 of the annexed drawings provides a list of possible vehicle components that can be actuated. It should be appreciated that this is not an exhaustive list but merely an example of components that can be controlled.

If at any point in the execution of the program the signal fails a validation step, the program is automatically interrupted and no action on the vehicle's motor or accessory is taken.

It will be appreciated that the ability of the system to validate the function component avoids or at least significantly reduces the risks of command misinterpretation by the controller that can be caused by electromagnetic noise or any other condition that can corrupts the function component, so that the received function component corresponds to a valid command other than what was intended by the user.

In a most preferred embodiment, the software in the memory 22 that controls the operation of the microprocessor unit 20 also contains code allowing the controller to act as a vehicle anti-theft device. At this end, the microprocessor unit 20 monitors several points of entry of the vehicle in order to sense attempts of unauthorized entry. If any such attempt is sensed, an alarm condition is established and a siren or any other signalling device is actuated. It is not deemed necessary to describe in detail the operation of such vehicle anti-theft system since its characteristics are known to those skilled in the art. The following discussion will be focused on a new feature of the vehicle anti-theft system which enables to enhance its functionality in the event the portable hand-held transmitter 10 is lost or it is not functioning properly.

The vehicle anti-theft system in accordance with the invention can operate either in the active mode or in the passive mode. In the active mode, the system can be armed or disarmed by the portable hand-held transmitter. In contrast, in the passive mode, arming and disarming of the system occurs automatically after a predetermined exit or entry time in the vehicle. More specifically, after a predetermined period of time following the emit of the owner from the vehicle, the alarm system is armed. Similarly, when the owner enters the vehicle and turns the ignition to the ON position within a predetermined time period, the alarm disarms itself automatically. Entry and exit from the vehicle are sensed by the microprocessor 20 by monitoring the operation of the door switch 26 and the ignition switch 28.

Alarm systems that have active and passive operating modes as described above are well-known in the art. The novel aspect of the present invention resides in the ability of the system to switch from the active mode to the passive mode by opening the door and turning the ignition switch of the vehicle in a timed sequence. This is useful when the portable hand-held transmitter is lost or it is not operating properly. When such loss or malfunction occurs and the alarm system of the vehicle is in the active mode, the manual switch to the passive operative state allows the owner to still use his vehicle with the alarm system set the arm and disarm itself without the need of a portable hand-held transmitter.

Figure 5:
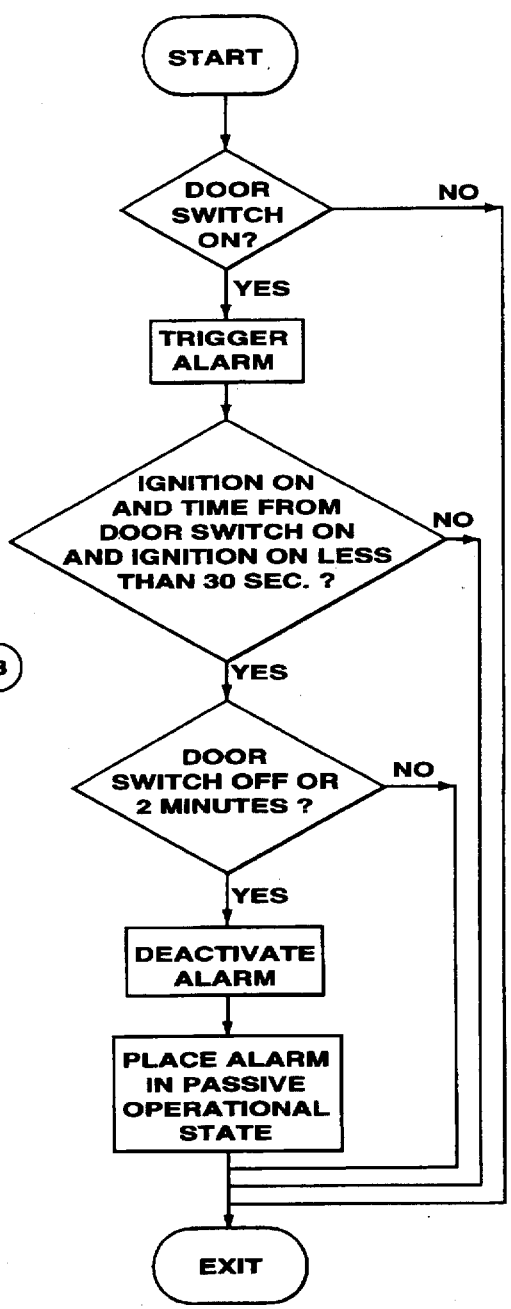
FIG. 5 is a simplified schematic illustration of a flow chart illustrating the operation by the controller for setting the alarm system in the passive operational state without the necessity of using the portable hand-held transmitter.

A flow chart of the operation of the alarm system is shown in FIG. 5. At the start block, the alarm is in the active state having been armed by use of the portable hand-held transmitter. In the absence of such transmitter to disarm the system, the owner must perform the following sequence of steps in order to switch the alarm system to the passive operative state. The door must be opened with the key which has the effect of temporarily triggering the alarm. Within thirty seconds, the owner must switch the ignition key to the ON position without starting the engine and close the door of the vehicle. The door must be closed for a period of two minutes. During that time period the alarm is still triggered. After the expiration of the two minute period, the alarm system automatically assumes the passive operational state. Therefore, when the owner leaves the vehicle, the alarm arms itself after a predetermined amount of time and disarms itself following the entry of the owner within the vehicle. In this operational state of the alarm system, the vehicle can be conveniently operated until the portable hand-held transmitter has been replaced or repaired.

Figure 6:
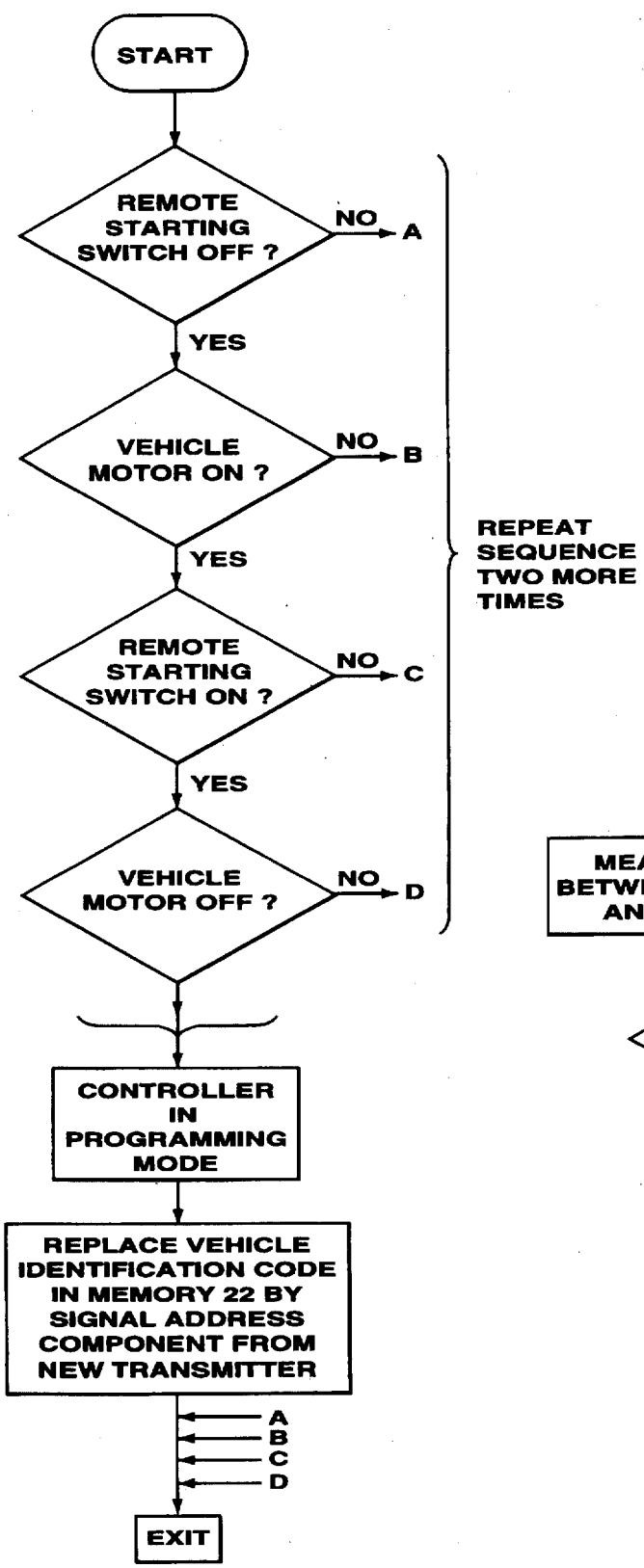
FIG. 6 is a simplified schematic illustration of a flow chart illustrating the operation of the controller for entering into the programming mode without using the portable hand-held transmitter.

The controller unit includes an additional feature than enhances its functionality in a situation where the portable hand-held transmitter is lost or malfunctioning. Since the microprocessor unit 20 is designed to accept as valid only one, very specific address code, when a new hand-held transmitter is to be used by the owner for reason that the original transmitter has been lost or damaged beyond repair, the microprocessor unit 20 must be reprogrammed to recognize the address code of the new transmitter. In order to avoid the necessity of servicing the car by a technician to effect such reprogramming, the present invention provides a novel feature allowing the user to set the microprocessor unit in a program mode by actuating in a timed sequence certain components of the vehicle, as described below. FIG. 6 illustrates the flow chart of the programming operation. Firstly, the remote starting switch 27 must be placed to OFF position. Then the engine of the vehicle is started. Next, the remote starting switch is placed to the ON position. Finally the engine of the vehicle is turned OFF. This sequence must be repeated two more times so as to place the microprocessor unit 20 in the programming mode. When the programming mode is reached, it suffices to generate a signal from the new portable hand-held transmitter. The vehicle identification code stored in the memory 22 is then overwritten and replaced by the address component of the received signal. At that point, the system will recognize and validate signals incoming only from the new transmitter.

It is pointed out that the details of the construction of the blocks representing the various circuits of the hand-held transmitter and the controller units are not discussed herein because they are standard state of the art circuits that are known to the notional addressee.

The scope of the present invention is not limited by the description, examples and suggestive uses herein, as modifications can be made without departing from the spirit of the invention. Thus, it is intended that the present application covers the modifications and variations of this invention provided that they come within the scope of the appended claims and their equivalents.

We claim:

1. A system for remotely operating one or more selected components of a vehicle, said one or more components including at least the vehicle's engine, said system comprising:
   a portable transmitter, including:
   a) means for generating a binary sequence including an address component uniquely identifying a vehicle to which said binary sequence is directed, a function component indicative of a desired operational state of each said selected component of the vehicle and a validation function component, said validation function component being constituted by said function component in a coded state;
   b) means for transmitting said binary sequence as a radio frequency signal;
   a controller for mounting in the vehicle, said controller including:
   c) means for receiving said radio frequency signal and for deriving from said radio frequency signal said address component, said function component and said validation function component;
   d) means for storing a vehicle identification code uniquely identifying the vehicle in which said controller is to be mounted;
   e) means for comparing said vehicle identification code with said address component;
   f) means for decoding said validation function component for generating a decoded validation function component;
   g) means for comparing said function component and said decoded validation function component; and
   h) means for generating a signal for interfacing with the vehicle to bring said one or more selected components of the vehicle into the desired operational state when at least the following conditions are met:
      i) said address component matches said vehicle identification code; and
      ii) said decoded validation function component matches said function component.

2. A system as defined in claim 1, wherein said means for generating the binary sequence includes means for coding said function component for generating said validation function component.

3. A system as defined in claim 2, wherein said function component includes a sequence of bits, said coding means including means for reversing a logical state of each bit of said sequence of bits, whereby a logical 1 in said sequence of bits becomes a logical 0 and a logical 0 in said sequence of bits becomes a logical 1.

4. A system as defined in claim 1, wherein said means for storing a vehicle identification code includes a non-volatile memory.

5. A system as defined in claim 3, wherein said validation function component includes a sequence of bits, said means for decoding said validation function component includes means for reversing a logical state of each bit of the sequence of bits of said validation function component, whereby a logical 1 in the sequence of bits of said validation function component becomes a logical 0 and a logical 0 in the sequence of bits of the validation function component becomes a logical 1.

6. A system as defined in claim 1, wherein said binary sequence includes a predetermined number of bits, said controller includes means for counting said number of bits to validate said binary coded sequence.

7. A system as defined in claim 1, further comprising memory means in which is stored a table of function codes, each function code representing an operative state of a remotely operable component of the vehicle, said system further comprising means for comparing said function component with individual ones of said function codes and when a match is established between said function component and a particular one of said function codes for generating the signal interfacing with said vehicle to bring the selected component of the vehicle in the operational state corresponding to said particular one of said function codes.

8. A system as defined in claim 7, wherein one of said function codes is indicative of an operational status of a component of a vehicle selected in the group consisting of engine, alarm system, door locks, door windows and trunk.

9. An electronic remotely controlled vehicle security system, comprising:
- a portable transmitter for generating a predetermined RF command signal;
- vehicle antitheft means for mounting in a vehicle, said vehicle antitheft means being capable of selectively assuming either one of an active operational state and a passive operational state, said vehicle antitheft means including;
  - a) means for receiving said predetermined RF command signal;
  - b) detecting means for sensing attempted intrusions in the vehicle,
  - c) means for generating an alarm signal responsive to indication of a detected intrusion by said detecting means when said vehicle antitheft means is in an armed mode, said vehicle antitheft means being capable of assuming a disarmed mode in which said vehicle antitheft means is disabled, in said active operational state said vehicle antitheft means being responsive to said predetermined RF command signal for switching from one of said armed and disarmed modes to another of said armed and disarmed modes, in said passive operational state said vehicle antitheft means being responsive to an operation of at least one component of the vehicle for switching from one of said armed and disarmed modes to another of said armed and disarmed modes after a predetermined time interval has elapsed from said operation, said vehicle antitheft means when in said active operational state being responsive to an operation of at least one component of the vehicle for switching from said active operational state to said passive operational state.

10. A system as defined in claim 9, wherein said vehicle antitheft means is responsive to an operation in a predetermined sequence of at least two components of the vehicle for switching from said active operational state to said passive operational state.

11. A system as defined in claim 10, wherein one of said components is an ignition switch.

12. A system as defined in claim 10, wherein said vehicle antitheft means is responsive to:
  i) operation of a first component of the vehicle; and
  ii) operation of a second component of the vehicle different from the first component of the vehicle within a predetermined time frame from the operation of the first component of the vehicle;
  for switching from said active operational state to said passive operational state.

13. A system as defined in claim 9, wherein the one component of the vehicle is selected in the group consisting of ignition switch and door.

14. A system as defined in claim 12, wherein the first component is a door.

15. A system as defined in claim 14, wherein the second component is an ignition switch.

16. An electronic remote starting system for use with a vehicle comprising:
  a) an internal combustion motor;
  b) an electric starter motor to start-up the internal combustion motor;
  c) a solenoid device for establishing a driving relationship between the electric starter motor and the internal combustion motor, thereby allowing the electric starter motor to crank the internal combustion motor;
  d) a conductor establishing an electrical path for supplying electrical energy to the solenoid device;
  e) a key operated ignition switch in said electrical path;
  f) a safety-switch in said electrical path between the ignition switch and the solenoid device, the safety switch being responsive to a position of a shift lever of a transmission of the vehicle, when the shift lever is in a position such that the transmission establishes a driving relationship between the motor of the vehicle and a wheel thereof, the safety switch being in an opened condition to prevent actuation of the solenoid device, said electronic remote starting system comprising;
    i) a portable transmitter for generating a predetermined RF signal conveying a command to start a motor of the vehicle;
    ii) a controller for mounting on the vehicle, said controller including:
      a receiver for sensing said predetermined RF signal;
      an electrical conductor for connection to said electrical path between said ignition switch and said safety switch, said controller means for enabling energization of said solenoid device for cranking the internal combustion motor in response to reception of said predetermined RF signal by said receiver;
      said controller including means for sensing an electrical condition of the safety switch through an electrical pathway including said electrical conductor to preclude energization of the solenoid device when the safety switch is in the opened condition.

17. A system as defined in claim 16, wherein said means for sensing an electrical condition of the safety switch include means for ascertaining a level of conductivity on the electrical path from a point on the electrical path located between the ignition switch and the safety switch and ground.

* * * * *